(12) United States Patent  
Chou et al.

(10) Patent No.: US 6,564,783 B2
(45) Date of Patent: May 20, 2003

(54) AIR-SUPPLYING STRUCTURE FOR MULTI-CYLINDER ENGINE

(75) Inventors: Etsuo Chou, Oyama (JP); Rie Katayama, Oyama (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/968,868

(22) Filed: Oct. 3, 2001

(65) Prior Publication Data

US 2002/0056444 A1 May 16, 2002

(30) Foreign Application Priority Data

Oct. 5, 2000 (JP) ........................................ 2000-306603

(51) Int. Cl.$^7$ ............................................... F02B 33/00
(52) U.S. Cl. ...................... 123/559.1; 123/563; 123/562
(58) Field of Search ............................... 123/559.1, 562, 123/563; 60/599, 612

(56) References Cited

U.S. PATENT DOCUMENTS

| | | | | |
|---|---|---|---|---|
| 2,780,053 A | * | 2/1957 | Cowland | 60/612 |
| 4,400,945 A | * | 8/1983 | Deutschmann et al. | 60/612 |
| 4,457,134 A | * | 7/1984 | Deutschmann | 60/612 |
| 4,638,634 A | * | 1/1987 | McLean | 60/612 |
| 4,753,076 A | * | 6/1988 | Deutschmann et al. | 60/612 |
| 5,528,902 A | * | 6/1996 | Hoerl et al. | 60/612 |
| 6,378,308 B1 | * | 4/2002 | Pfluger | 60/612 |

FOREIGN PATENT DOCUMENTS

| | | | | |
|---|---|---|---|---|
| EP | 0 780 555 A2 | * | 6/1997 | 60/612 |
| JP | 352044317 A | * | 4/1977 | 60/612 |
| JP | 355109726 A | * | 8/1980 | 60/612 |
| JP | 355109727 A | * | 8/1980 | 60/612 |

* cited by examiner

Primary Examiner—Thomas Denion
Assistant Examiner—Thai-Ba Trieu
(74) Attorney, Agent, or Firm—Armstrong, Westerman & Hattori, LLP

(57) ABSTRACT

A air supplying structure for multi-cylinder engine comprising six pieces of high-pressure stage superchargers 51, six pieces of low-pressure stage superchargers 52, two pieces of intercoolers 63 arranged between the high-pressure stage and low-pressure stage superchargers, and six pieces of aftercoolers 62 arranged between the high-pressure stage superchargers and cylinders, in which each high-pressure stage supercharger 51 is connected with three pieces of cylinders, each aftercooler 62 is connected with each high-pressure stage supercharger 51, the two pieces of intercoolers 63 are arranged at opposite sides of the engine body 2 along the arranging direction of the cylinders, each intercooler 63 is connected with three pieces of low-pressure stage superchargers 52, and the three pieces of the low-pressure stage superchargers 52 are connected to the three pieces of cylinders in the right bank and the six pieces of cylinders in the left bank, which cylinders are arranged near the associated intercooler 63.

2 Claims, 5 Drawing Sheets

AIR-SUPPLYING STRUCTURE FOR MULTI-CYLINDER ENGINE

BACKGROUND OF THE INVENTION

1. Field of the Invention

The present invention relates to an air supplying structure for multi-cylinder engine, and more particularly to a multi-cylinder engine including an 18-cylinder engine body to be supercharged in a two-staged manner.

2. Description of Related Art

In vehicular engines, it has been known to provide superchargers for pressurizing intake air and feeding it into cylinders. Such superchargers are classified into: a mechanically driven type for compressing the intake air by the driving force of the engine itself; and an exhaust-gas turbine type for compressing the intake air by rotating a turbine by the exhaust gas of the engine.

Exhaust-gas turbine type superchargers are provided with a turbine, a compressor, and a shaft member for coupling the turbine and compressor, such that the turbine is rotated by an exhaust gas to thereby rotate the compressor through the shaft member, so as to compress the intake air by the compressor.

Differently from the exhaust-gas turbine type superchargers, the shaft member is rotated by mechanical means such as a motor in mechanically driven type superchargers, so as to rotate the compressor to thereby compress the intake air.

In engines having such superchargers, compressing the intake air by the supercharger elevates the temperature of the intake air to thereby eventually decrease the density of the intake air, thereby possibly increasing a heat load such as onto the cylinders and/or lowering the supercharging efficiency. Particularly, in an air-supplying structure for conducting a multistage supercharge by series connecting superchargers so as to stepwise supercharge, the temperature of the intake air is further elevated, thereby considerably lowering the supercharging efficiency and increasing the heat load onto the cylinders.

To solve such problems, it has been known to provide a cooler for cooling the compressed intake air, in air-supplying structures of engines. For example, in an air-supplying structure for conducting the two-staged supercharging, there are provided: an inter-cooler between series connected two superchargers; and an after cooler between the downstream side supercharger and the cylinders so as to cool the intake air compressed by and supplied from the upstream side and downstream side superchargers, respectively.

Meanwhile, in a multi-cylinder engine adopting the two-staged supercharging scheme, such as in a V-type 12-cylinder engine including totally 12 cylinders comprising two 6-cylinder banks, there are totally provided four pairs of superchargers such that each three adjacent cylinder set of one bank is connected to one pair of superchargers which cooperatively conduct the two-staged supercharging. In such a 12-cylinder engine, there are provided two intercoolers for cooling the compressed intake air, one at the front and the other at the back of the engine, such that the intercooler provided at the front is connected with the forwardly provided two pairs of superchargers and the intercooler provided at the rear is connected with the rearwardly provided two pairs of superchargers. Alternatively, the two pairs of superchargers connected to one bank may be connected to the (forward) one of the intercoolers, and the other two pairs of superchargers connected to the other bank may be connected to the (rearward) other of the intercoolers.

Further, such as in a V-type 16-cylinder engine including totally 16 cylinders comprising two 8-cylinder banks, there are totally provided four pairs of superchargers such that each four adjacent cylinder set of one bank is connected to one pair of superchargers which cooperatively conduct the two-staged supercharging. Here, the size of the 16-cylinder engine is larger than that of the 12-cylinder engine, to the extent of the increased number of cylinders. In such a 16-cylinder engine, there are provided two intercoolers similarly to the 12-cylinder engine, one at the front and the other at the back of the engine, such that the intercooler provided at the front is connected with the forwardly provided two pairs of superchargers and the intercooler provided at the rear is connected with the rearwardly provided two pairs of superchargers.

As described above, those engines having a lesser number of cylinders are constituted such that all of the superchargers connected to the cylinders of one bank are connected to one of the two intercoolers, while those engines having an even number of cylinders provided at each bank are constituted such that the cylinders are divided into the front and rear groups and the front side superchargers connected to the front group cylinders are connected to the front intercooler and the rear side superchargers connected to the rear group cylinders are connected to the rear intercooler.

Meanwhile, in large-sized vehicles such as construction machines, there has been demanded a larger-sized engine due to the increasing working loads. However, such a larger-sized engine is to have a larger number of cylinders, to thereby cause such a problem that air-supplying structures of a good efficiency in no way are obtained such as by the provision of superchargers in the same manner as the conventional.

For example, in an engine including totally 18 cylinders comprising one 9-cylinder bank and the other 9-cylinder bank, connecting all of the superchargers of one of the banks to one of the inter-coolers will increase the length of tubes between the superchargers and inter-coolers due to the increased number of cylinders.

Further, dividing the cylinders into two groups in the fore-and-aft direction leads to groups of 4 cylinders and 5 cylinders, because one bank is provided with an even number of cylinders (i.e., nine pieces of cylinders). This requires preparation of two types of volumes (sizes) of superchargers including one to be connected to 5 cylinders and the other to be connected to 4 cylinders, to thereby problematically increase the types of constituent parts as well as the cost.

SUMMARY OF THE INVENTION

The present invention has been carried out in view of the problems as described above, and it is therefore an object of the present invention to provide an air supplying structure for a multi-cylinder engine capable of commonizing constituent parts and of shortening the tubes connecting between superchargers and coolers.

Namely, the present invention provides an air supplying structure for a multi-cylinder engine for conducting a two-staged supercharging to an engine body totally including 18 pieces of cylinders comprising nine pieces of cylinders serially arranged in one bank and nine pieces of cylinders serially arranged in the other bank, the air supplying structure for multi-cylinder engine comprising: totally six sets of supercharging units, each set of supercharging unit being constituted of a low-pressure stage supercharger and a high-pressure stage supercharger which are series arranged with each other so as to conduct the two-staged supercharge; each of the high-pressure stage superchargers including a compressor having an outlet connected to three pieces of adjacent cylinders which are provided in the same bank of the engine body; totally six pieces of aftercoolers, each aftercooler being connected to an intake air passage between each of the high-pressure stage superchargers and the three pieces of cylinders; and totally two pieces of intercoolers, each intercooler being connected to those outlets of compressors of the three pieces of the low-pressure stage superchargers; wherein the two pieces of inter-coolers are arranged at the opposite sides of the engine body, respectively, along the arranging direction of the cylinders; wherein the three pieces of the low-pressure stage superchargers to be connected to one intercooler of the two pieces of intercoolers are connected, through the high-pressure stage superchargers series arranged to the three pieces of low-pressure stage superchargers, to the three pieces of cylinders in the one bank and the six pieces of cylinders in the other bank, which cylinders are arranged near the one intercooler; and wherein the three pieces of the low-pressure stage superchargers to be connected to the other intercooler of the two pieces of intercoolers are connected, through the high-pressure stage superchargers series arranged to the three pieces of low-pressure stage superchargers, to the six pieces of cylinders in the one bank and the three pieces of cylinders in the other bank, which cylinders are arranged near the other intercooler.

According to the present invention, each intercooler and each aftercooler are provided at the outlet sides of the associated low-pressure stage supercharger and high-pressure stage supercharging, respectively, in the air-supplying structure for conducting the two-staged supercharging by the 6 sets of series arranged low-pressure stage supercharger and high-pressure stage supercharger, thereby allowing to highly compress the intake air and to lower the temperature of the intake air. This allows an increase in the amount of the intake air for each cylinder to thereby increase the output power of the engine.

Further, each aftercooler is connected to three pieces of cylinders in the 18-cylinder engine thereby allowing to downsize the aftercoolers. Since the cylinders are divided into 3-piece groups of cylinders and each three pieces of cylinders are connected to each associated aftercooler, all of the six pieces of aftercoolers can be standardized to a 3-cylinder size.

Moreover, since each high-pressure stage supercharger is operatively connected to three pieces of cylinders, the volumes of the six pieces of high-pressure stage superchargers can be standardized to a smaller or 3-cylinder size, and the volumes of the six pieces of low-pressure stage superchargers series arranged to the six pieces of high-pressure stage superchargers, respectively, can be also standardized to a smaller or 3-cylinder size. This allows to commonize the constituent parts, thereby reducing the manufacturing cost.

Each intercooler is connected with totally three pieces of low-pressure stage superchargers comprising: one piece of low-pressure stage supercharger connected to the three pieces of cylinders in one bank near the intercooler; and two pieces of low-pressure stage superchargers connected to the six pieces of cylinders in the other bank near the intercooler. This allows to shorten the length of tubes for connecting these low-pressure stage superchargers and the associated intercooler, than the situation where all of the low-pressure stage superchargers connected to the cylinders of one bank are connected the one intercooler. Further, by connecting the remaining three pieces of low-pressure stage superchargers to the other intercooler, the tubing constitution for connecting the two pieces of intercoolers and six pieces of low-pressure stage superchargers can be constituted in a centrosymmetric manner about the substantial center of the engine, to thereby commonize the tubing parts at the forward side and rear side of the engine.

Also, the tubing constitution for connecting the six pieces of after-coolers and six pieces of high-pressure stage superchargers are constituted in a centrosymmetric manner about the substantial center of the engine similarly to the aforementioned tubing constitution for connecting the intercoolers and low-pressure stage superchargers, thereby allowing to commonize the tubing parts.

In the present invention, the intercoolers and the aftercoolers are preferably supplied with a cooling liquid introduced from a cooling circuit separated from an engine body cooling circuit for cooling the engine body.

Usually, temperatures of a cooling liquid for cooling an engine body such as an engine block are set near 80° C. so as to maintain a combustion efficiency. As such, the temperature of the intake air can not be sufficiently lowered, when the cooling liquid from the engine body cooling circuit for cooling the engine body is introduced into the intercoolers and aftercoolers, for example.

In the present invention, the intercoolers and the aftercoolers are supplied with a cooling liquid introduced from the cooling circuit separated from the engine body cooling circuit, so that the cooling liquid at sufficiently lower temperatures can be supplied to the intercoolers and aftercoolers, to thereby sufficiently lower the temperature of the intake air. This allows to increase the density of the intake air to thereby increase the amount of the intake air into the cylinders, thereby assuredly increasing the output power of the engine.

Further, the intake air compressed by the low-pressure stage supercharger can be cooled by the intercooler having the lower coolant temperature, so as to increase the density of the intake air compressed by the low-pressure stage supercharger, to thereby allow to decrease the flow rate per unit weight at the inlet of the high-pressure stage supercharger. This allows to downsize the high-pressure stage supercharger, to thereby improve the rapid acceleration responsibility of the engine.

DETAILED DESCRIPTION OF THE PREFERRED EMBODIMENT(S)

There will be described hereinafter the embodiment according the present invention, with reference to the accompanying drawings.

[1. Overall Constitution of Engine]

Figure 1:
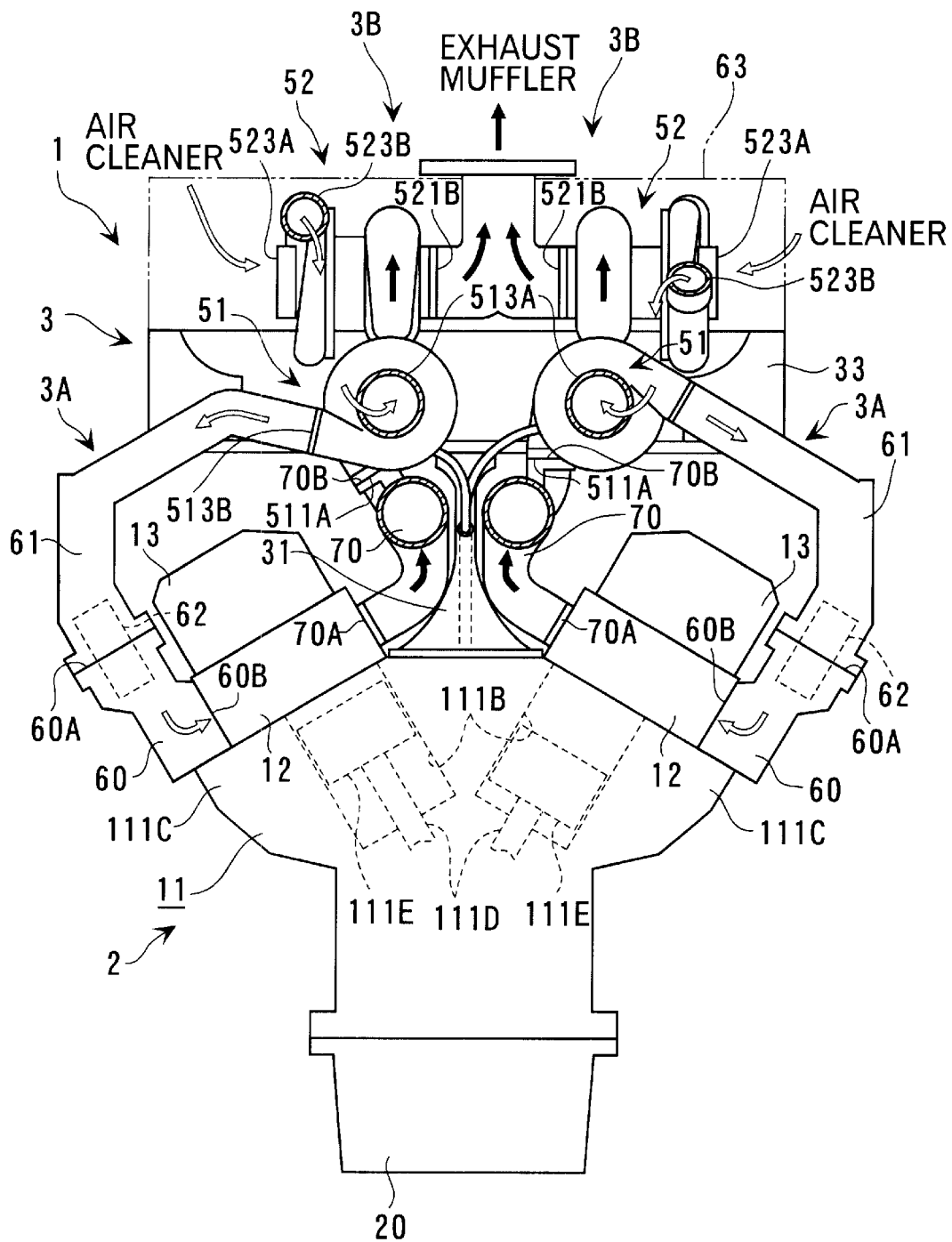
FIG. 1 is a view showing an engine according to an embodiment of the present invention.

Shown in FIG. 1 is a 18-cylinder engine 1 according to an embodiment of the present invention.

The engine 1 is provided with an engine body 2 and an air feeding and exhausting system 3 for feeding and exhausting air to and from the engine body 2. The air feeding and exhausting system 3 is provided with supercharging units for conducting the two-staged supercharging, and each supercharging unit is constituted of series arranged high-pressure stage supercharger 51 and low-pressure stage supercharger 52.

The engine body 2 is constituted to include: an engine block 11 (so-called V-type engine block) including both banks 111C provided with cylinders 111B; cylinder heads 12 mounted on the banks 111C of the engine block 11 to thereby form top walls of the cylinders 111B, respectively; and head covers 13 provided on the cylinder heads 12, respectively. The engine block 11 is mounted, at the lower portion thereof, with an oil pan 20.

Provided within each of the cylinders 111B of the engine block 11 is a piston 111E coupled to a crankshaft (not shown) via connecting rod 111D. These pistons 111E are upwardly and downwardly moved within the cylinders 111B, respectively, as the crankshaft is rotated.

Figure 2:
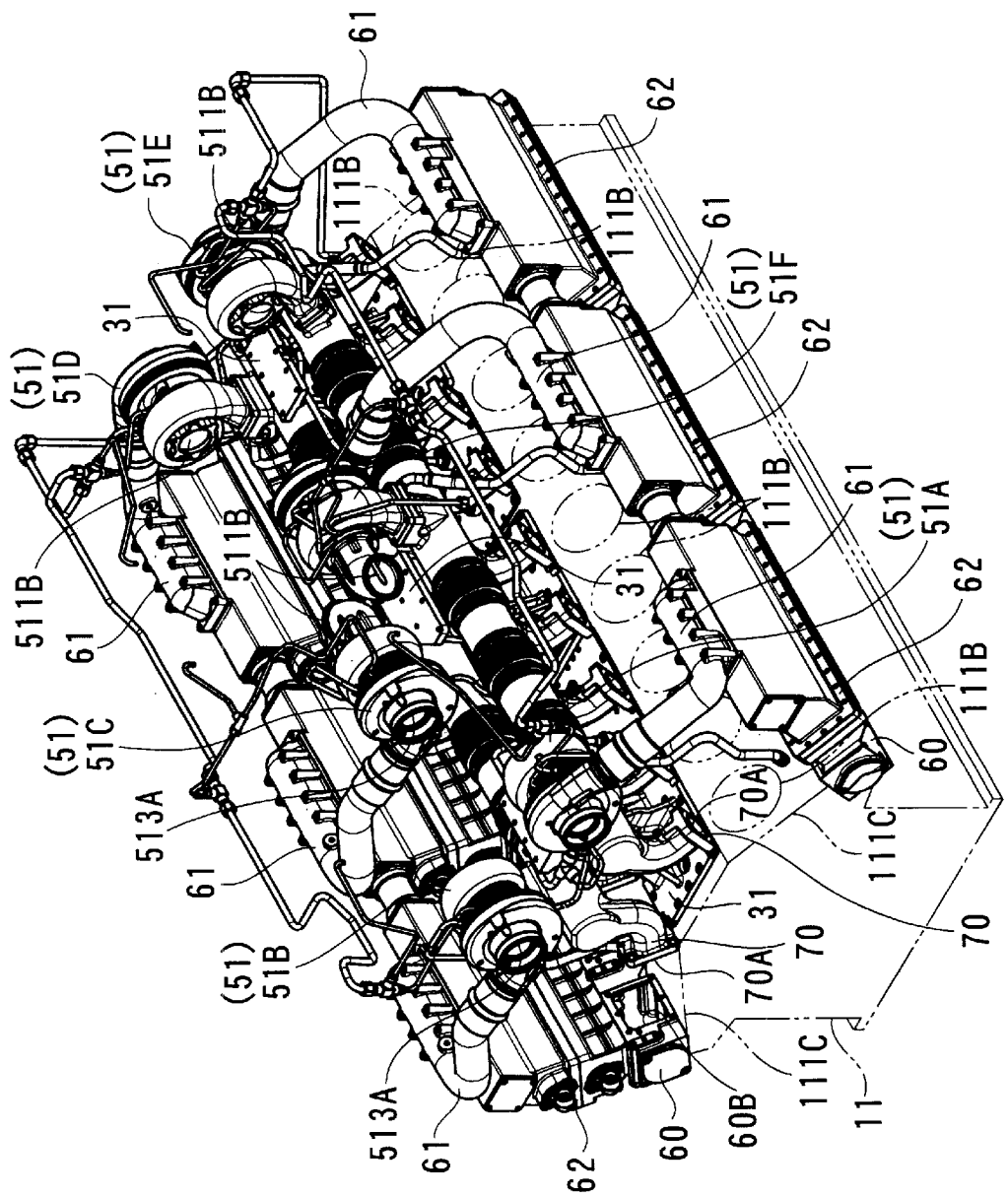
FIG. 2 is a perspective view of the engine showing high-pressure stage superchargers and aftercoolers of the above embodiment.

The engine block 11 is formed in a manner extended in the direction perpendicularly to the drawing plane of FIG. 1. As shown in FIG. 2, each of the two banks 111C is arranged with nine pieces of cylinders 111B along the longitudinal direction of the engine block 11, to thereby totally provide 18 pieces of cylinders 111B.

In FIG. 1 and FIG. 2, each cylinder head 12 is connected with a feeding manifold 60 and an exhausting manifold 70 cooperatively constituting the air feeding and exhausting system 3. Each feeding manifold 60 is connected to a compressor outlet 513B of an associated high-pressure stage supercharger 51 via first feeding tube 61, and each exhausting manifold 70 is connected to a turbine inlet 511A of the associated high-pressure stage supercharger 51.

Figure 3:
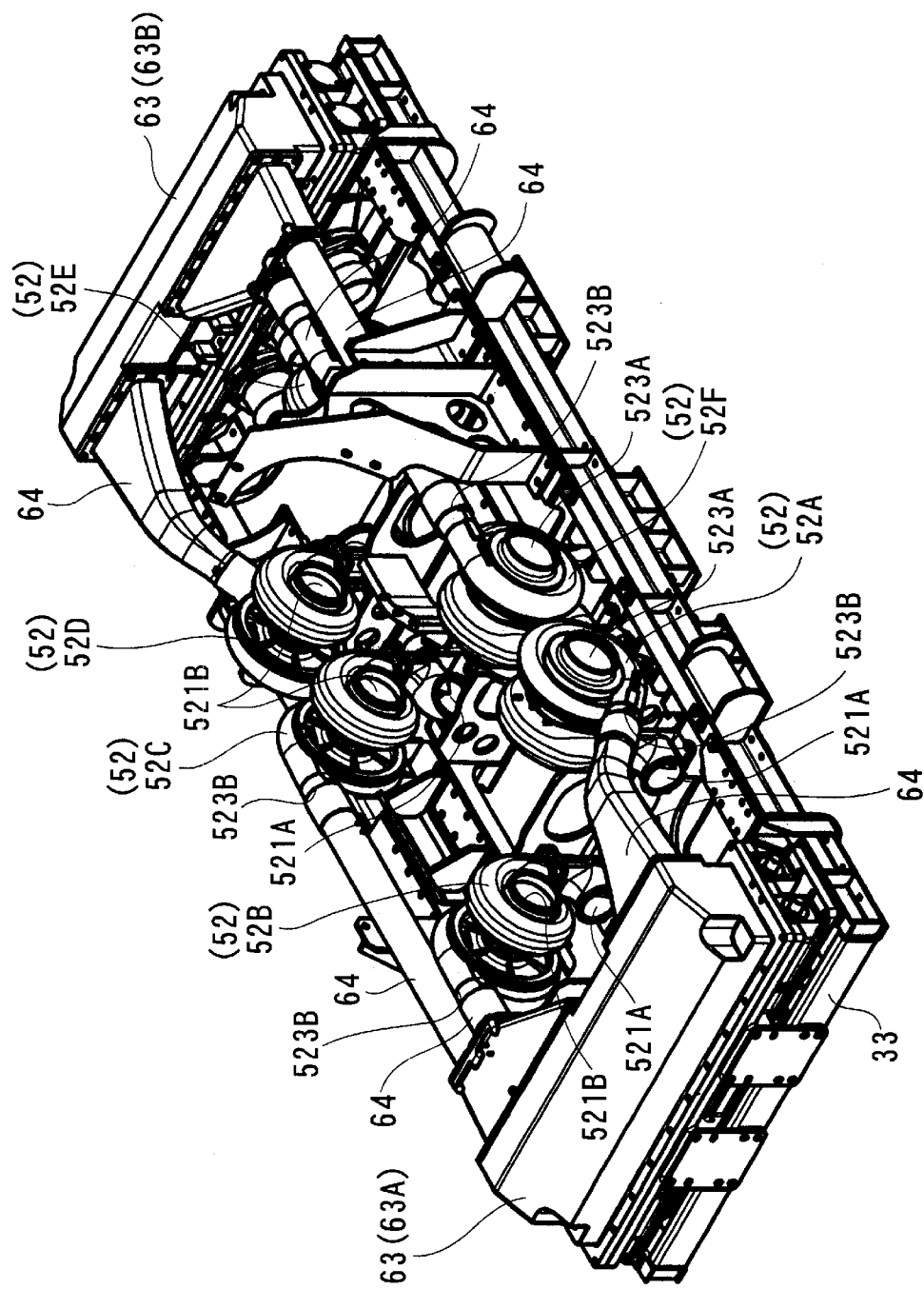
FIG. 3 is a perspective view of the engine showing low-pressure stage superchargers and intercoolers of the above embodiment.

Upstandingly provided between the right and left banks 111C of the engine block 11 are brackets 31 provided with frame brackets 33 as shown in FIG. 3, and the frame brackets 33 are mounted with the low-pressure stage superchargers 52 and inter-coolers 63 of the air feeding and exhausting system 3.

[2. Air Feeding and Exhausting System]

The air feeding and exhausting system 3 comprises: air feeding systems 3A arranged at outer sides of the V-type banks 111C of the engine block 11, respectively; and air exhausting systems 3B arranged at inner sides of the banks 111C of the engine block 11, respectively, so as to interpose the brackets 31 between the air exhausting systems 3B.

In each air feeding system 3A, the feeding gas (air) introduced from an associated air cleaner (not shown) is introduced into a compressor (blower) inlet 523A of the associated low-pressure stage supercharger 52. As shown in FIG. 3, such low-pressure stage superchargers 52 are totally 6 in number, so that compressor outlets 523B of the low-pressure stage superchargers 52 are connected via six pieces of second feeding tubes 64 to the intercoolers 63, respectively.

The provided intercoolers 63 are totally two in number such that the intercoolers 63 are arranged on the frame brackets 33 at the front and back (right and left in FIG. 3) of the engine body 2, respectively, along the arranging direction of the cylinders 1113. Each intercooler 63 is connected with three pieces of low-pressure stage superchargers 52.

The intercoolers 63 are connected, via tubes (not shown), to compressor inlets 513A of the high-pressure stage superchargers 51, such that each intercooler 63 is connected with three pieces of high-pressure stage superchargers 51 so that the engine 1 is provided with totally six units of high-pressure stage superchargers 51 (FIG. 2). Note, the six sets of supercharging units of the present invention are constituted of six pieces of high-pressure stage superchargers 51, and six pieces of low-pressure stage superchargers 52 series arranged to these six pieces of high-pressure stage superchargers 51, respectively.

The compressor outlets 513B of the six pieces of high-pressure stage superchargers 51 are connected to inlets 60A of the feeding manifolds 60 via six pieces of first feeding tubes 61, respectively. Provided between the outlet of each first feeding tube 61 and the inlet 60A of the associated feeding manifold 60 is an aftercooler 62, so that the engine 1 is provided with totally six pieces of 3-cylinder type aftercoolers 62.

Connected, via cylinder head 12, to the branchedly provided outlets 60B of each feeding manifold 60 are the associated cylinders 111B, such that the cylinders 111B are supplied with the feeding gas via air-feeding valves (not shown) provided at the associated cylinder heads 12, respectively. Note, the feeding manifolds 60 for one bank 111C cooperatively include totally nine pieces of outlets 60B, correspondingly to the number of cylinders 111B at one bank 111C.

In the above, the three pieces of high-pressure stage superchargers 51 connected to the forward side (left side in FIG. 3) intercooler 63A of the aforementioned two pieces of intercoolers 63 include: a first high-pressure stage supercharger 51A connected, via feeding manifold 60, to the forward side three pieces of cylinders 111B of the left bank 111C (bank 111C arranged at this side in FIG. 2); a second high-pressure stage supercharger 51B connected, via feeding manifold 60, to the forward side three pieces of cylinders 111B of the right bank 111C (bank 111C arranged at the opposite side in FIG. 2); and a third high-pressure stage supercharger 51C connected, via feeding manifold 60, to the three pieces of cylinders 111B arranged at the center of the right bank 111C.

Meanwhile, the three pieces of high-pressure stage superchargers 51 connected to the rear side (right side in FIG. 3) intercooler 63B include: a fourth high-pressure stage supercharger 51D connected, via feeding manifold 60, to the rear side three pieces of cylinders 111B of the right bank 111C; a fifth high-pressure stage supercharger 51E connected, via feeding manifold 60, to the rear side three pieces of cylinders 111B of the left bank 111C; and a sixth high-pressure stage supercharger 51F connected, via feeding manifold 60, to the three pieces of cylinders 111B arranged at the center of the left bank 111C.

This allows the tubing configuration for connecting the two pieces of intercoolers 63 with the six pieces of high-pressure stage superchargers 51 to be constituted in a centrosymmetric or point-symmetric manner about the substantial center of the engine 1, to thereby commonize the tubing parts at the forward side and rear side of the engine 1.

Further, the first feeding tubes 61 for connecting the six pieces of high-pressure stage superchargers 51 with the six pieces of aftercoolers 62 can be also constituted in a centrosymmetric manner about the substantial center of the engine 1, such that first feeding tubes 61 are commonized between the right and left banks 111C.

In the air exhausting system 3B, the exhausting manifolds 70 are introduced with the exhaust gas exhausted from the cylinders 111B of the engine block 11, via exhaust valves (not shown) of cylinder heads 12, respectively. Note, the exhausting manifolds 70 for one bank 111C cooperatively include: totally nine pieces of inlets 70A connected to the cylinder heads 12, respectively, correspondingly to the number of cylinders 111B at one bank 111C; and totally three pieces of outlets 70B which are connected to the turbine inlets 511A of the three pieces of high-pressure stage superchargers 51, respectively. Further, each high-pressure stage supercharger 51 includes a turbine outlet 511B (FIG. 2) connected to a turbine inlet 521A (FIG. 3) of the associated low-pressure stage supercharger 52, while the low-pressure stage supercharger 52 includes a turbine outlet 521B eventually connected to an exhaust muffler (not shown).

Figure 4:
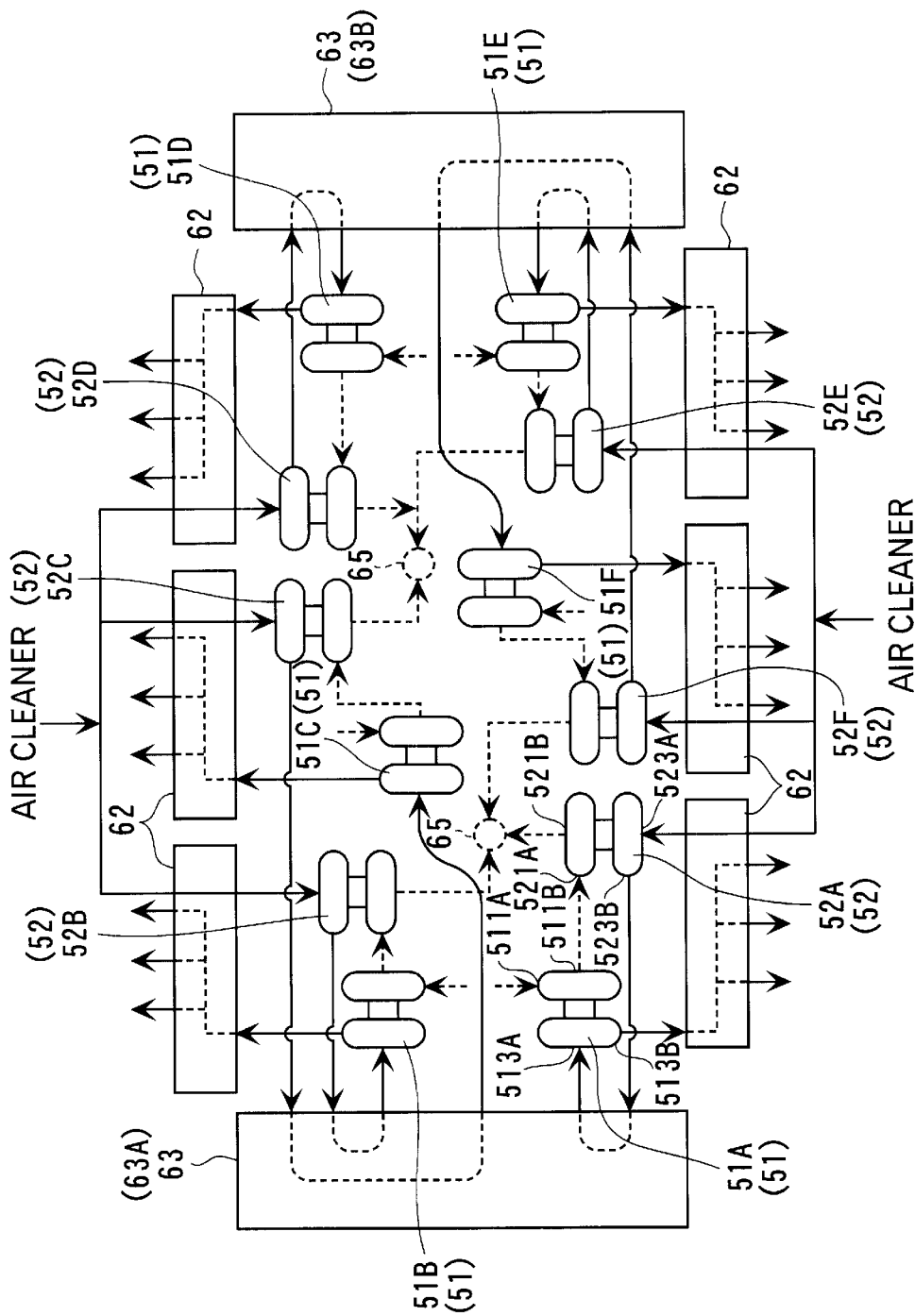
FIG. 4 is a schematic view showing an intake air flow and an exhaust gas flow in the above embodiment.

As schematically shown in FIG. 4, each high-pressure stage supercharger 51 is series arranged near the associated low-pressure stage supercharger 52 in such an air feeding and exhausting system 3, so as to effectively connect the turbine outlet 511B of the high-pressure stage supercharger 51 to the turbine inlet 521A of the associated low-pressure stage supercharger 52 in a shortened manner.

In the above, the forward side intercooler 63A of the two pieces of intercoolers 63 is connected, via second feeding tubes 64, with three pieces of low-pressure stage superchargers 52 comprising the three pieces of first through third low-pressure stage superchargers 52A, 52B, 52C series arranged to the first through third high-pressure stage superchargers 51A, 51B, 51C connected to the forward side intercooler 63A.

In contrast, the rear side intercooler 63B is connected, via second feeding tubes 64, with three pieces of low-pressure stage superchargers 52 comprising the three pieces of fourth through sixth low-pressure stage superchargers 52D, 52E, 52F series arranged to the fourth through sixth high-pressure stage superchargers 51D, 51E, 51F connected to the rear side intercooler 63B.

Thus, similarly to the tubing constitution for connecting the two pieces of intercoolers 63 and six pieces of high-pressure stage superchargers 51, the second feeding tubes 64 for connecting the two pieces of intercoolers 63 and six pieces of low-pressure stage superchargers 52 can be constituted in a centrosymmetric manner about the substantial center of the engine 1, to thereby commonize the second feeding tubes 64 between the forward side and rear side of the engine 1.

There will be hereinafter described the flows of intake air and exhaust gas in such an air feeding and exhausting system 3, with reference to FIG. 4. Note, there shall be described only the flow of intake air and exhaust gas in the paired and series arranged superchargers 51A, 52A, and the flows of intake air and exhaust gas of the other pairs of superchargers 51, 52 shall be omitted because they are the same as that in the superchargers 51A, 52A.

The feeding gas (an arrow indicated by a solid line in FIG. 4) sucked via air cleaner (not shown) is compressed by passing through the compressor inlet 523A and compressor outlet 523B of the first low-pressure stage supercharger 52A, and brought into the intercooler 63. The intake air cooled by the intercooler 63 is compressed by passing through the compressor inlet 513A and compressor outlet 513B of the first high-pressure stage supercharger 51A, and brought into the associated aftercooler 62. Although not shown, the intake air cooled within the aftercooler 62 is supplied into the cylinders 111B, via feeding manifold 60 and cylinder heads 12.

The exhaust gas (arrows indicated by broken lines in FIG. 4) exhausted from the cylinders 111B is passed through the cylinder heads 12 and exhausting manifolds 70 (not shown); passed through the turbine inlet 511A and turbine outlet 511B of the first high-pressure stage supercharger 51A to thereby rotate a turbine blade (not shown) of the first high-pressure stage supercharger 51A; then passed through the turbine inlet 521A and turbine outlet 521B of the first low-pressure stage supercharger 52A, to thereby rotate a turbine blade of the first low-pressure stage supercharger 52A; and finally exhausted to the atmosphere via exhaust muffler 65.

[3. Cooling Structure]

There will be described hereinafter the cooling structure of the engine 1.

Figure 5:
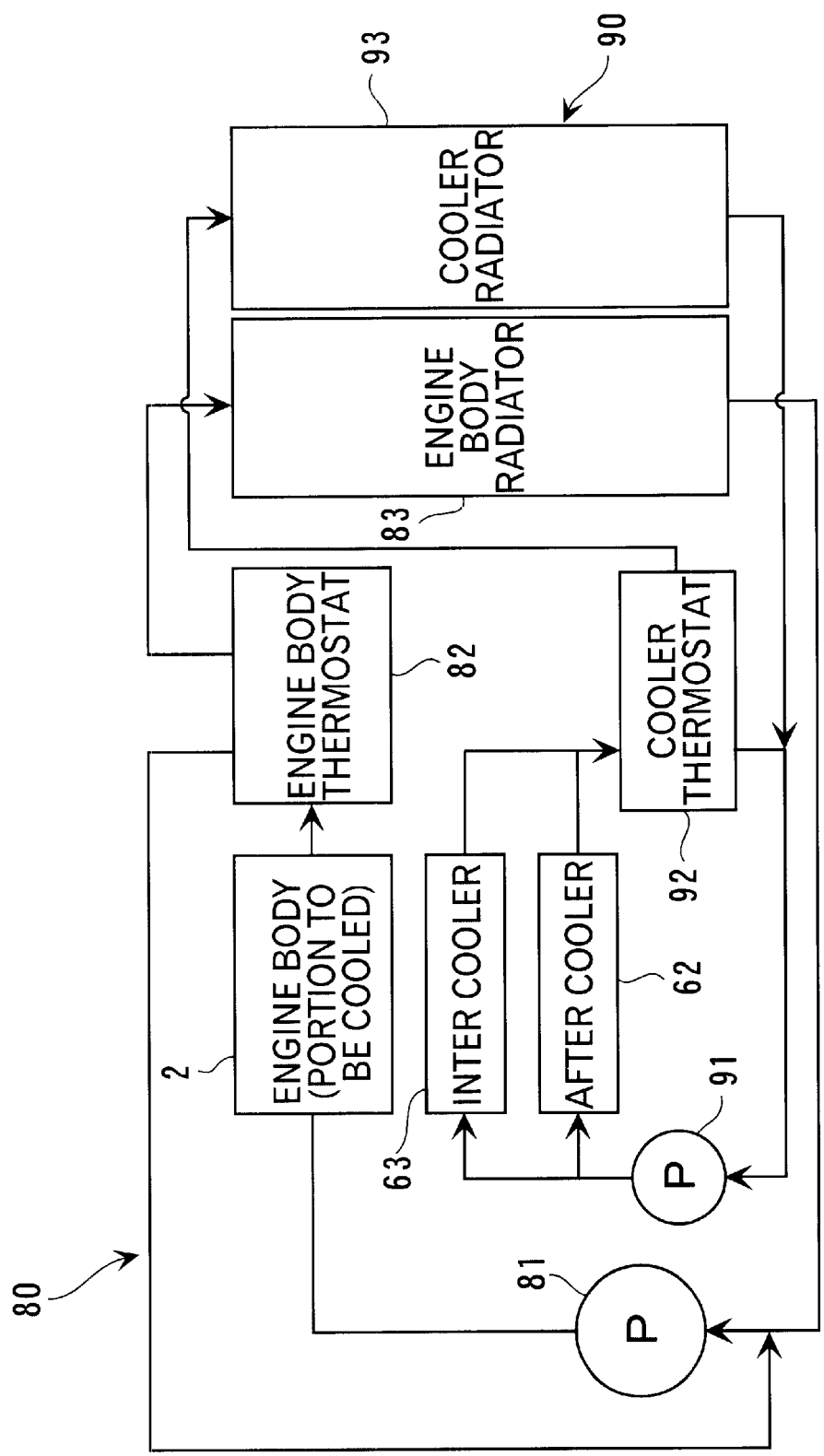
FIG. 5 is a block diagram showing a cooling structure in the above embodiment.

As shown in FIG. 5, the engine 1 is provided with an engine body cooling circuit 80 for cooling the engine body 2, and an intake air cooling circuit 90 for cooling the intake air.

The engine body cooling circuit 80 is provided for supplying a cooling liquid to those portions of the engine body 2 to be cooled, and is constituted to include an engine body pump 81, an engine body thermostat 82, and an engine body radiator 83. The portions of the engine body 2 to be cooled include a water jacket (not shown) formed in the engine block 11 and the cylinder heads 12.

The intake air cooling circuit 90 is provided for supplying the cooling liquid to the aftercoolers 62 and intercoolers 63, and is constituted to include a cooler pump 91, a cooler thermostat 92 and a cooler radiator 93.

In the engine body cooling circuit 80 having such a constitution, the cooling liquid is pumped by the engine body pump 81, and is brought into the engine body thermostat 82 after cooling those portions of the engine body 2 to be cooled. At the engine body thermostat 82, the cooling liquid is distributed into that component to be again pumped, via engine body pump 81, to those portions to be cooled; and that component to be sent to the engine body radiator 83 so as to be cooled thereby; depending on the raised temperature of the cooling liquid which has cooled those portions of the engine body 2 to be cooled. Here, the temperature setting of the engine body thermostat 82 is selected to be near 80° C. so as not to deteriorate the combustion efficiency due to the overcooling of the engine body 2. This increases: the amount of cooling liquid to be pumped by the engine body pump 81 when the temperature of the cooling liquid is below 80° C.; and the amount of the cooling liquid to be flowed to the engine body radiator 83 when the temperature of the cooling liquid is 80° C. or higher.

Meanwhile, in the intake air cooling circuit 90, the cooling liquid is pumped by the cooler pump 91, then supplied to the aftercoolers 62 and intercoolers 63 to thereby cool the intake air, and finally brought into the cooler thermostat 92. Note, the six pieces of aftercoolers 62 and two pieces of intercoolers 63 are represented by single blocks, respectively, in FIG. 5.

At the cooler thermostat 92, the cooling liquid is distributed into: that component to be again pumped, via cooler pump 91, to the coolers 62, 63; and that component to be sent to the cooler radiator 93 so as to be cooled thereby; depending on the raised temperature of the cooling liquid which has cooled the compressed intake air in the superchargers 51, 52. Here, differently from the engine body thermostat 82, the temperature setting of the cooler thermostat 92 is selected to be 50° C. to 60° C. so as to fully cool the intake air. This increases the amount of cooling liquid to be pumped again by the cooler pump 91 when the temperature of the cooling liquid is 50° C. to 60° C. and the amount of the cooling liquid to be flowed to the cooler radiator 93 when the temperature of the cooling liquid is 50° C. to 60° C. or higher.

The aforementioned embodiment provides the following effects.

(1) The aftercoolers 62 and intercoolers 63 are provided at the sides of the compressor outlets 513B, 523B, respectively, in the air-supplying structure for conducting the two-staged supercharge by the superchargers 51, 52. This allows to lower the temperature of the intake air while highly compressing the intake air, so as to increase the amount of the intake air into the cylinders 111B, to thereby increase the output power of the engine.

Further, each aftercooler 62 is connected with three pieces of cylinders 111B, thereby allowing to downsize the aftercoolers 62 in the 18-cylinder engine 1. Moreover, connecting each three pieces of cylinders to the associated aftercooler 62 allows to standardize all of the six pieces of aftercoolers 62 to a 3-cylinder size.

In addition, each high-pressure stage supercharger 51 is connected to the three pieces of associated cylinders 111B, thereby allowing to standardize the volumes of the six pieces of high-pressure stage superchargers 51 to a three-cylinder-aimed smaller size, and thereby allowing to standardize the volumes of the six pieces of low-pressure stage superchargers 52 series arranged to the six pieces of high-pressure stage superchargers 51, respectively, to thereby allow to commonize the constituent parts and to reduce the manufacturing cost.

Moreover, the forward side intercooler 63A is connected with the forward side first high-pressure stage supercharger 51A, second high-pressure stage supercharger 51B and third high-pressure stage supercharger 51C, as well as with the forward side first low-pressure stage supercharger 52A, second low-pressure stage supercharger 52B and third low-pressure stage supercharger 52C. This allows to shorten the length of the tubes for connecting between those superchargers 51, 52 and the associated intercooler 63. Further, similarly to the forward side intercooler 63A, also the rear side intercooler 63B is connected with the rear side fourth high-pressure stage supercharger 51D, fifth high-pressure stage supercharger 51E and sixth high-pressure stage supercharger 51F, as well as the rear side fourth low-pressure stage supercharger 52D, fifth low-pressure stage supercharger 52E and sixth low-pressure stage supercharger 52F. This also allows to shorten the length of the tubes for connecting those high-pressure stage and low-pressure stage superchargers 51, 52 and the associated intercooler 63.

Further, connecting the two pieces of intercoolers 63 and 12 pieces of superchargers 51, 52 in the above manner allows to constitute the tubing constitution of the intercoolers and superchargers in a centrosymmetric manner about the substantial center of the engine 1, to thereby commonize the forward side and rear side tubing parts of the engine 1.

In addition, the tubing constitution for connecting the six pieces of aftercoolers 62 and six pieces of high-pressure stage superchargers 51 is also constituted in a centrosymmetric manner about the substantial center of the engine 1, to thereby commonize the tubing parts.

(2) The cooling liquid to be supplied to the intercoolers 63 and aftercoolers 62 is introduced from the intake air cooling circuit 90 separated from the engine body cooling circuit 80, thereby allowing to supply the cooling liquid at lower temperatures to the coolers 62, 63 so as to sufficiently lower the temperature of the intake air. This allows to increase the density of the intake air to thereby increase the air amount to be sucked into the cylinders 111B, thereby assuredly increase the output power of the engine.

Further, the intake air compressed by the low-pressure stage supercharger 52 can be cooled by the intercooler 63 having the lower coolant temperature, so as to increase the density of the intake air compressed by the low-pressure stage supercharger 52, to thereby allow to decrease the flow rate per unit weight at the inlet of the high-pressure stage supercharger 51. This allows to downsize the high-pressure stage supercharger 51, to thereby improve the rapid acceleration responsibility of the engine 1.

(3) In the cooling structure, the temperature setting of the engine body thermostat 82 is selected to be near 80° C., thereby allowing to reduce the heat load onto the engine body 2 without deteriorating the combustion efficiency of the engine 1. Further, the temperature setting of the cooler thermostat 92 is selected to be 50° C. to 60° C., thereby allowing to increase the density of the intake air without deteriorating the combustion efficiency, to thereby increase the output power of the engine.

The present invention is not limited to the aforementioned embodiment, and embraces those variations and improvements insofar as they achieve the object of the present invention within the spirit and scope of the present invention.

For example, in the cooling structure of the aforementioned embodiment, the temperature setting of the engine body thermostat 82 has been selected to be near 80° C. and the temperature setting of the cooler thermostat 92 has been selected to be 50° C. to 60° C. However, the present invention is not limited thereto, and it is possible to adopt a suitable temperature setting. In the engine body thermostat 82, it is desirable to adopt such a temperature setting capable of reducing the heat load onto the engine body 2 and keeping the combustion efficiency of the engine. In the intake air cooling circuit 90, it is desirable to adopt such a temperature setting capable of sufficiently increasing the density of the intake air and keeping the combustion efficiency of the engine.

In the above embodiment, the cooling liquid to be supplied to the aftercoolers 62 and intercoolers 63 has been introduced from the intake air cooling circuit 90, separately from the engine body cooling circuit 80 for cooling the engine body 2. However, it is possible to introduce the cooling liquid of the engine body cooling circuit 80 into the coolers 62, 63, and such a situation is also embraced within the scope of the present invention. Nonetheless, it is of course desirable to mutually separate the engine body cooling circuit 80 and intake air cooling circuit 90 such that the cooling liquid is introduced into the coolers 62, 63 from the intake air cooling circuit 90 separated from the engine body cooling circuit 80, thereby allowing to set the coolant temperature of the engine body cooling circuit 80 at the optimum temperature for cooling the engine body 2 and to the coolant temperature of the intake air cooling circuit 90 at the optimum

What is claimed is:

1. An air supplying structure for multi-cylinder engine for conducting a two-staged supercharging to an engine body totally including 18 pieces of cylinders comprising nine pieces of cylinders serially arranged in one bank and nine pieces of cylinders serially arranged in the other bank, said air supplying structure for multi-cylinder engine comprising:

totally six sets of supercharging units, each set of the supercharging units being constituted of a low-pressure stage supercharger and a high-pressure stage supercharger which are series arranged with each other so as to conduct the two-staged supercharging;

each of said high-pressure stage superchargers including a compressor having an outlet connected to three pieces of adjacent cylinders which are provided in the same bank of said engine body;

totally six pieces of aftercoolers, each aftercooler being connected to an intake air passage between each of said high-pressure stage superchargers and three pieces of cylinders; and totally two pieces of intercoolers, each intercooler being connected to the outlets of compressors of three pieces of said low-pressure stage superchargers;

wherein said two pieces of intercoolers are arranged at the opposite sides of said engine body, respectively, along the arranging direction of said cylinders;

wherein the three pieces of said low-pressure stage superchargers to be connected to one intercooler of said two pieces of intercoolers are connected, through said high-pressure stage superchargers series arranged to the three pieces of low-pressure stage superchargers, to the three pieces of cylinders in the one bank and the six pieces of cylinders in the other bank, which cylinders are arranged near the one intercooler; and wherein the three pieces of said low-pressure stage superchargers to be connected to the other intercooler of said two pieces of intercoolers are connected, through said high-pressure stage superchargers series arranged to the three pieces of low-pressure stage superchargers, to the six pieces of cylinders in the one bank and the three pieces of cylinders in the other bank, which cylinders are arranged near the outer intercooler.

2. An air supplying structure for multi-cylinder engine of claim 1, wherein said intercoolers and said aftercoolers are supplied with a cooling liquid introduced from a cooling circuit separated from an engine body cooling circuit for cooling said engine body.

* * * * *